(12) United States Patent
Tada

(10) Patent No.: US 8,359,359 B2
(45) Date of Patent: Jan. 22, 2013

(54) DEVICE, METHOD, AND COMPUTER PROGRAM PRODUCT FOR SUPPORTING CREATION OF REPLY MAIL

(75) Inventor: Masami Tada, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 12/627,049

(22) Filed: Nov. 30, 2009

(65) Prior Publication Data
US 2010/0169445 A1 Jul. 1, 2010

(30) Foreign Application Priority Data

Dec. 26, 2008 (JP) ................................ 2008-332201

(51) Int. Cl.
G06F 15/16 (2006.01)
(52) U.S. Cl. .................... 709/206; 709/224; 715/752
(58) Field of Classification Search .................... 709/206
See application file for complete search history.

(56) References Cited

U.S. PATENT DOCUMENTS

| | | | | |
|---|---|---|---|---|
| 6,823,368 B1 * | 11/2004 | Ullmann et al. | ............... | 709/206 |
| 7,657,839 B2 * | 2/2010 | Moody et al. | ................ | 715/752 |
| 7,818,385 B2 * | 10/2010 | Naick et al. | ................... | 709/206 |
| 7,962,508 B2 * | 6/2011 | Moody et al. | ................ | 707/769 |
| 8,095,604 B2 * | 1/2012 | Essenmacher et al. | ........ | 709/206 |
| 2002/0091772 A1 * | 7/2002 | Yong | .............................. | 709/206 |
| 2003/0135567 A1 * | 7/2003 | Reilly | ............................ | 709/206 |
| 2004/0073616 A1 * | 4/2004 | Fellenstein et al. | ............ | 709/206 |
| 2004/0078488 A1 * | 4/2004 | Patrick | ........................... | 709/245 |
| 2004/0090457 A1 * | 5/2004 | Serdy et al. | .................. | 345/752 |
| 2005/0177621 A1 * | 8/2005 | Moody et al. | ................. | 709/206 |
| 2005/0198143 A1 * | 9/2005 | Moody et al. | ................. | 709/206 |
| 2005/0223063 A1 * | 10/2005 | Chang et al. | ................... | 709/206 |
| 2006/0075040 A1 * | 4/2006 | Chmaytelli | .................... | 709/206 |
| 2006/0165289 A1 * | 7/2006 | Boss et al. | ..................... | 382/182 |
| 2006/0168067 A1 * | 7/2006 | Carlson et al. | ................ | 709/206 |
| 2006/0173824 A1 * | 8/2006 | Bensky et al. | .................... | 707/3 |
| 2006/0179114 A1 * | 8/2006 | Deeds | ........................... | 709/206 |
| 2006/0271625 A1 * | 11/2006 | Kordun | ......................... | 709/204 |

(Continued)

FOREIGN PATENT DOCUMENTS

JP 08-030524 A 2/1996
JP 10-143451 A 5/1998

(Continued)

*Primary Examiner* — Firmin Backer
*Assistant Examiner* — Hamza Algibhah
(74) *Attorney, Agent, or Firm* — Jeffrey T. Holman

(57) ABSTRACT

A device and method are described to create a reply message in which, even in a case where electronic messages are exchanged among a plurality of users, a past electronic message to be referred to as a desired reply message can be efficiently retrieved, and trouble in creating a reply message can be reduced. When a first electronic message that has been stored most recently has been extracted from history information, and when an instruction indicating that the body part of the first electronic message is necessary has been accepted, the body part of the first electronic message is temporarily stored. A second electronic message that has been stored next most recently is extracted from the history information. When information on a source in the header part of the second electronic message does not match information on the author of a reply message, the address of the source is set to the address of the destination of the reply message, the temporarily stored body part is added to the reply message, and history information preceding the second electronic message is added.

9 Claims, 8 Drawing Sheets

U.S. PATENT DOCUMENTS

| | | | |
|---|---|---|---|
| 2007/0011255 A1* | 1/2007 | Miyamoto | 709/206 |
| 2007/0106948 A1* | 5/2007 | Ala-Rantala | 715/752 |
| 2007/0250479 A1* | 10/2007 | Lunt et al. | 707/3 |
| 2007/0273754 A1* | 11/2007 | Cockerton et al. | 348/14.08 |
| 2008/0046511 A1* | 2/2008 | Skrenta | 709/204 |
| 2008/0109735 A1* | 5/2008 | Vuong | 715/752 |
| 2008/0235344 A1* | 9/2008 | Paul | 709/206 |
| 2008/0268827 A1* | 10/2008 | Parthipan | 455/418 |
| 2009/0037537 A1* | 2/2009 | Callanan et al. | 709/206 |
| 2009/0037541 A1* | 2/2009 | Wilson | 709/206 |
| 2009/0049139 A1* | 2/2009 | Fouotsop et al. | 709/206 |
| 2009/0089382 A1* | 4/2009 | Garrett | 709/206 |
| 2009/0106375 A1* | 4/2009 | Carmel et al. | 709/206 |
| 2009/0125596 A1* | 5/2009 | Naick et al. | 709/206 |
| 2009/0228583 A1* | 9/2009 | Pocklington et al. | 709/224 |
| 2009/0282494 A1* | 11/2009 | Bhide et al. | 726/28 |
| 2009/0300517 A1* | 12/2009 | Kaneshiro et al. | 715/752 |
| 2009/0319617 A1* | 12/2009 | Bhakar et al. | 709/206 |
| 2010/0036917 A1* | 2/2010 | McCaffrey et al. | 709/206 |
| 2010/0070591 A1* | 3/2010 | Steuer et al. | 709/206 |
| 2010/0070592 A1* | 3/2010 | Steuer et al. | 709/206 |
| 2010/0083149 A1* | 4/2010 | McCaffrey et al. | 715/764 |
| 2010/0088377 A1* | 4/2010 | Johnson et al. | 709/206 |
| 2010/0100370 A1* | 4/2010 | Khouri et al. | 704/9 |
| 2010/0138499 A1* | 6/2010 | Belz et al. | 709/206 |
| 2010/0241713 A1* | 9/2010 | Shimizu | 709/206 |

FOREIGN PATENT DOCUMENTS

| | | |
|---|---|---|
| JP | 2001-016251 A | 1/2001 |
| JP | 2006-285345 A | 10/2006 |
| JP | 2007-213227 A | 8/2007 |
| JP | 2007-316941 A | 12/2007 |

\* cited by examiner

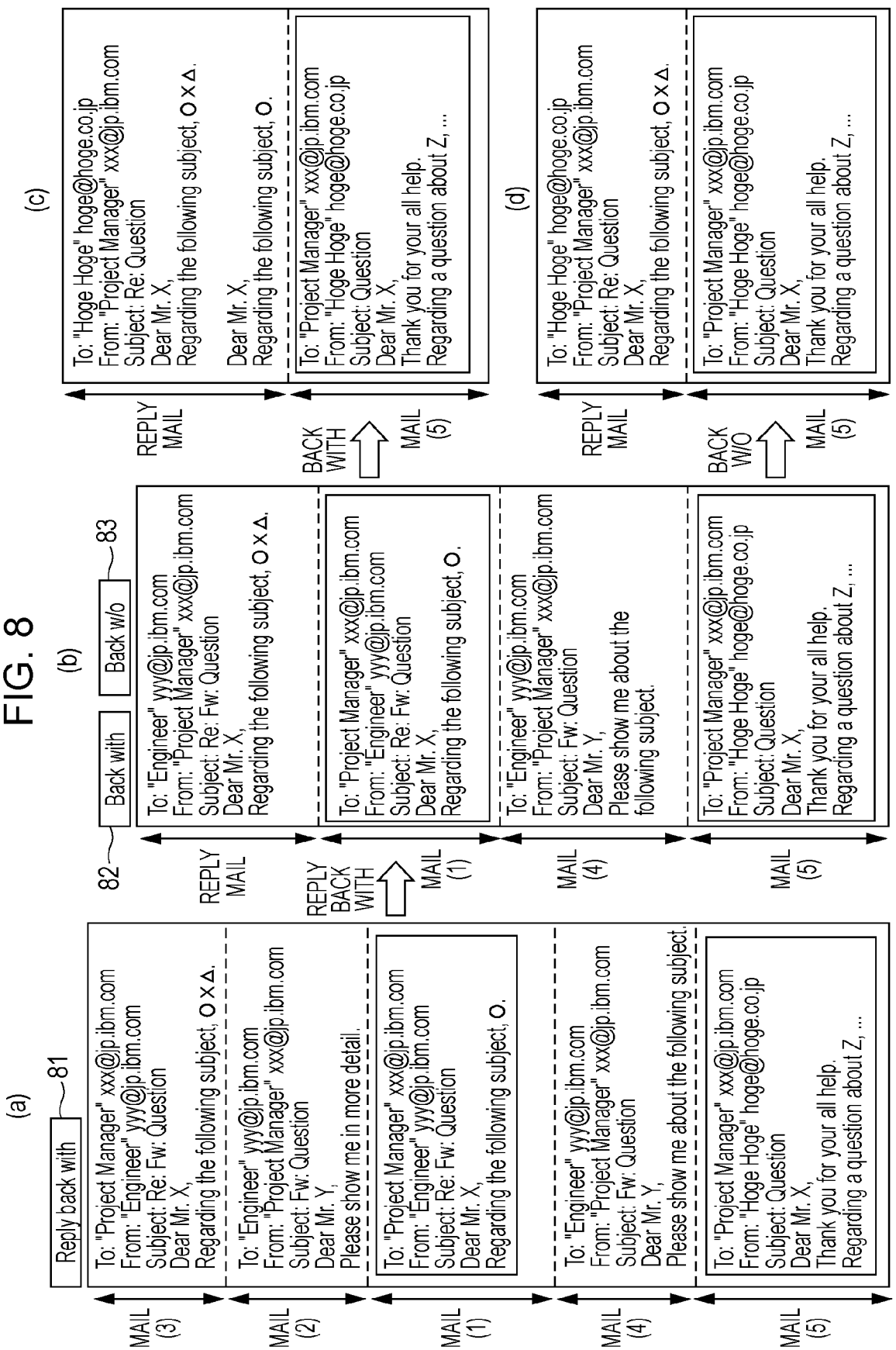

DEVICE, METHOD, AND COMPUTER PROGRAM PRODUCT FOR SUPPORTING CREATION OF REPLY MAIL

CROSS-REFERENCE TO RELATED APPLICATIONS

This application claims the benefit of priority of Japanese Patent Application No. 2008-332201 entitled "Device, Method, And Computer Program Product For Supporting Creation Of Reply Mail," which was filed on Dec. 26, 2008, and is hereby incorporated by reference.

BACKGROUND

With rapid development of the Internet technology, information is frequently exchanged, using electronic mail or messages. When electronic messages are exchanged, in many cases, a reply message is created. Often, the reply message refers to a previously transmitted message. When several electronic messages are exchanged during an ongoing communication, many past messages are typically referred to in the current message, resulting in a long electronic message.

Various types of techniques for improving the readability of an electronic message that has become long as a result of many exchanges of electronic messages have been developed. For example, some techniques use an electronic device in which information on the history and summary of exchanges of electronic messages can be clearly grasped by determining the header part and body part of each electronic message and displaying all the body parts together or hiding all the body parts at the same time. However, using these techniques, when electronic messages are exchanged among a plurality of users, it is difficult to determine which of the electronic messages should be referred to. For example, in a case where a specialist who is a third person is requested to return an answer to an electronic message that includes a question, and the answer from the specialist is returned to a questioner, creation of a reply message to the most recent electronic message means creation of a reply message with a destination which is not the original questioner, but the specialist who is a third person.

In this case, the reply message needs to be created with the questioner who first sent the electronic mail, which includes the question, as the destination, referring to the electronic mail. Thus, a problem exists in that, the larger the number of exchanges of electronic messages, the more difficult it is to retrieve an electronic message that is a basis for requesting the third person to return an answer.

SUMMARY

One embodiment of a device includes a history information storing unit for storing transmitted electronic messages, each of which includes a header part and a body part. The transmitted messages may include received and/or sent messages. The messages are stored in chronological order as history information. The device also includes a first extracting unit for extracting a first electronic message from the stored history information. The first electronic message is a most recently stored message. The device also includes an instruction accepting unit for accepting an instruction indicating that a body part of the first electronic message extracted by the first extracting unit is necessary. The device also includes a determining unit for determining whether the instruction accepting unit has accepted the instruction indicating that the body part is necessary. The device also includes a body part storing unit for storing the body part of the first electronic message when the determining unit determines that the instruction has been accepted. The device also includes a second extracting unit for extracting a second electronic message from the stored history information. The second electronic message is a next most recently stored message. The device also includes a source determining unit for determining whether information on a source in a header part of the second electronic message, which has been stored next most recently and extracted by the second extracting unit, matches information on an author of a reply message. The device also includes an address setting unit for setting an address of the source to an address of a destination of the reply message when the source determining unit determines that the information on the source does not match the information on the author. The device also includes a body part adding unit for adding the stored body part of the first electronic message to the reply message. The device also includes a history information adding unit for adding, to the reply message, history information preceding the second electronic message, which has been stored next most recently and extracted by the second extracting unit.

Moreover, in a further embodiment of the device, when the source determining unit determines that the information on the source in the header part of the second electronic message, which has been stored next most recently and extracted by the second extracting unit, matches the information on the author of the reply message, an additional electronic message that has been stored next most recently may be sequentially extracted from the stored history information until the source determining unit determines that the information on the source does not match the information on the author.

Moreover, in another embodiment of the device includes a reply instruction accepting unit for accepting an instruction to create a reply message. After the reply instruction accepting unit accepts the instruction to create the reply message and a regular reply message is created, extraction of an electronic message by the first extracting unit may be started.

In addition to the embodiments of the device described herein, corresponding embodiments of a method and a computer program product are also described, in which case the functional operations of the various units may be implemented by steps, processes, programming code and/or programming instructions. According to embodiments described herein, even in a case where electronic messages are exchanged among a plurality of users, a past electronic message to be referred to as a desired reply mail can be efficiently retrieved, and a reply message can be created by adding the body part of a retrieved electronic message. Moreover, an easily viewable reply message corresponding to the usage can be created by accepting an instruction indicating that the body part of a past electronic message is necessary.

BRIEF DESCRIPTION OF THE SEVERAL VIEWS OF THE DRAWINGS

FIG. 8 is an illustration of one embodiment of the process of creating a reply message in a case where history information is traced back more than once in the reply message creation support device.

DETAILED DESCRIPTION

Figure 1:
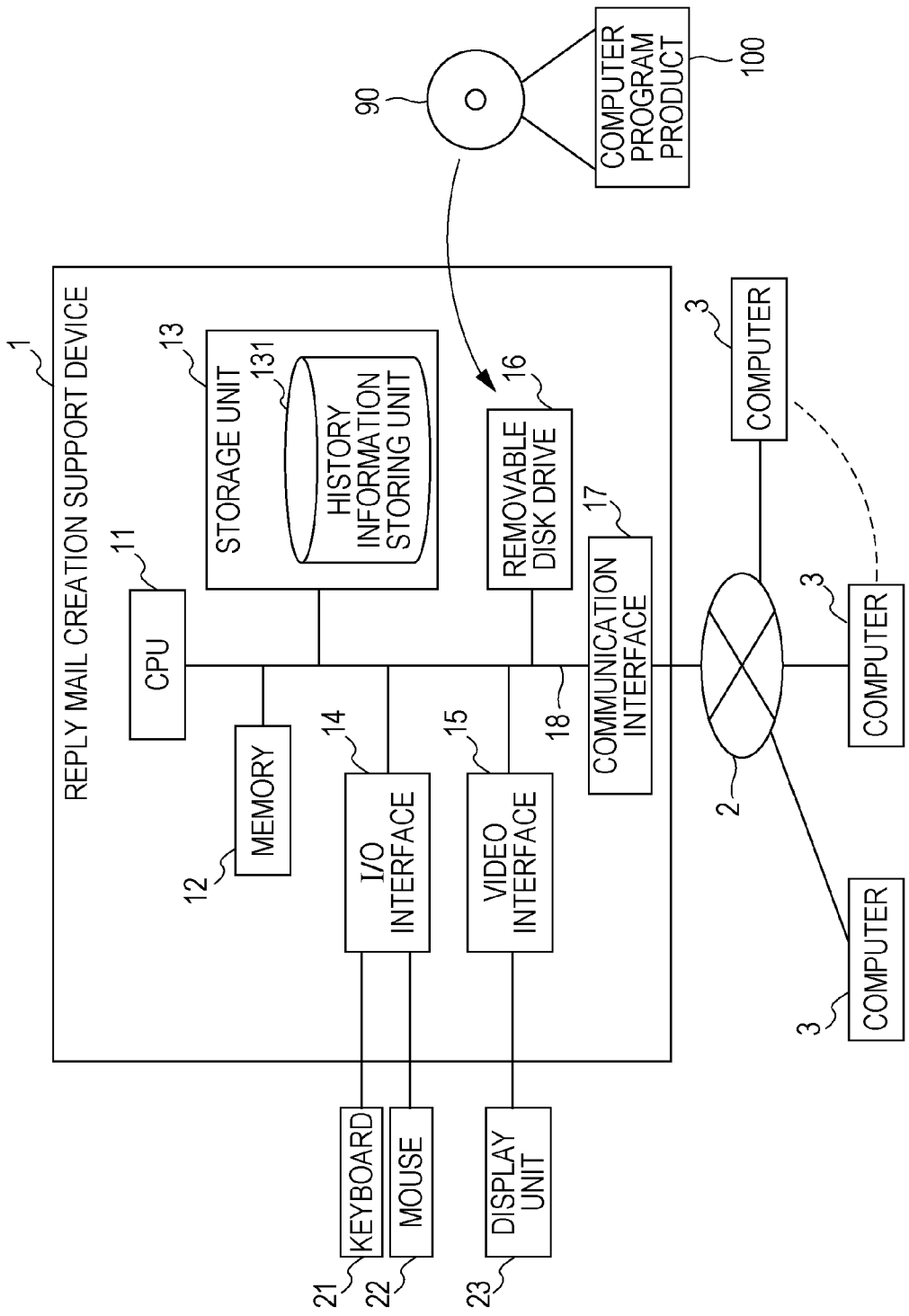
FIG. 1 is a block diagram showing one embodiment of components of a reply message creation support device that supports creation of a reply message.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The present invention relates to a device, a method, and a computer program product for supporting creation of a reply message in which trouble in creating a reply message in electronic messages exchanged among a plurality of users can be reduced. For reference, the terms "electronic messages" and "electronic mails" (or simply "messages" and "mail") may be used interchangeably, although both are used to merely indicate an electronic communication between two or more users, or at least a portion of such electronic communication. The following embodiments do not restrict the invention described in the claims. Needless to say, all the combinations of features described in the embodiments are not necessarily mandatory in every embodiment described herein.

Additionally, although many structural components described herein are referred to as "means" for performing certain functions, in specific embodiments the "means" may be implemented by differing forms of structural elements. For example, in some embodiments, the "means" are implemented by computer hardware components. In other embodiments, the "means" are implemented by functional software code, instructions, executables, or other programming elements, in whatever form, stored on a physical electronic storage device. In other embodiments, the "means" may be implemented by a combination of software and hardware elements.

Moreover, the present invention may be embodied in many different forms and should not be construed as being limited to the description of the embodiment. The same reference numerals are assigned to the same components throughout the embodiment.

In the following embodiment, a device that supports creation of a reply mail, a computer system in which a computer program product is installed, will be described. As is clear to those skilled in the art, within the context of the present description, embodiments described herein may be implemented as a computer program product that can be executed in a computer. Thus, the present invention may be embodied in hardware that is a device that supports creation of a reply mail, software, or a combination of software and hardware. The computer program product can be recorded in any computer-readable recording medium, for example, a hard disk, a DVD, a CD, an optical storage unit, or a magnetic storage unit.

In one embodiment, even in a case where electronic mails are exchanged among a plurality of users, a past electronic mail to be referred to as a desired reply mail can be efficiently retrieved, and a reply mail can be created by adding the body part of a retrieved electronic mail. Moreover, an easily viewable reply mail corresponding to the usage can be created by accepting an instruction indicating that the body part of a past electronic mail is necessary.

FIG. 1 is a block diagram showing one embodiment of components of a reply mail (or message) creation support device that supports creation of a reply mail. A reply mail creation support device 1 according to one embodiment is connected to a plurality of computers 3 so that data communication can be performed via networks 2. Electronic mails are sent and received among the computers 3 by causing one of the computers 3 to function as a mail server.

The reply mail creation support device 1 includes at least the following components: a central processing unit (CPU) 11, a memory 12, a storage unit 13, an I/O interface 14, a video interface 15, a removable disk drive 16, a communication interface 17, and an internal bus 18 that connects the aforementioned components to each other.

The CPU 11 is connected to the aforementioned hardware components of the reply mail creation support device 1 via the internal bus 18. The CPU 11 controls the respective operations of the aforementioned hardware components and performs various software functions according to a computer program product 100 stored in the storage unit 13. The memory 12 includes a volatile memory such as an SRAM or an SDRAM. When the computer program product 100 is executed, a load module is loaded into the memory 12, and temporary data generated during execution of the computer program product 100 and the like are stored in the memory 12.

The storage unit 13 includes an internal fixed storage unit (a hard disk), a ROM, and the like. The computer program product 100 stored in the storage unit 13 is downloaded from a removable recording medium 90 such as a DVD or a CD-ROM in which information such as program products and data is recorded, using the removable disk drive 16. When the computer program product 100 is executed, the computer program product 100 is loaded from the storage unit 13 into the memory 12 to be executed. The computer program product 100 may be downloaded from the external computers 3 connected to the networks 2 via the communication interface 17.

Moreover, the storage unit 13 includes a history information storing unit 131. The history information storing unit 131 stores electronic mails sent and received among the external computers 3 in chronological order starting from an electronic mail that has been sent and received most recently.

In the embodiment, before a reply mail is created, all the sent and received electronic mails are considered as history information, and after a reply mail is created, electronic mails other than the reply mail are considered as history information. That is, remaining electronic mails excluding a newly created reply mail are stored in the history information storing unit 131 as history information.

Figure 2:
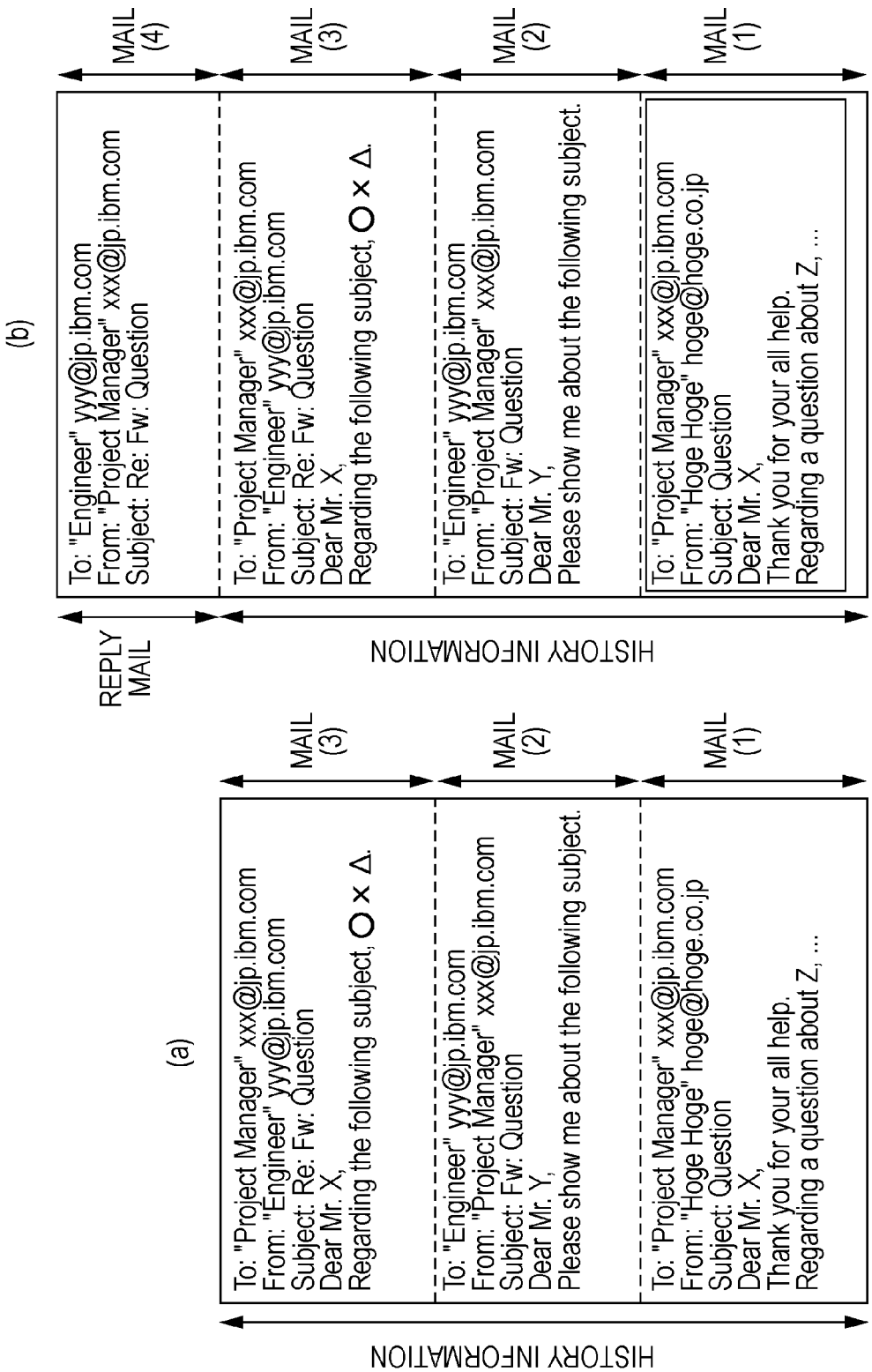
FIG. 2 is an illustration of one embodiment of the definition of history information.

FIG. 2 is an illustration of one embodiment of the definition of history information. In a case where sent and received electronic mails exist, as shown in FIG. 2(*a*), mails (1), (2), and (3) are stored together in the history information storing unit 131 as history information. In a case where a reply mail to the mail (3) is created, as shown in FIG. 2(*b*), the mails (1), (2), and (3) are history information, but a created mail (4) is a reply mail and is not stored in the history information storing unit 131.

Figure 3:
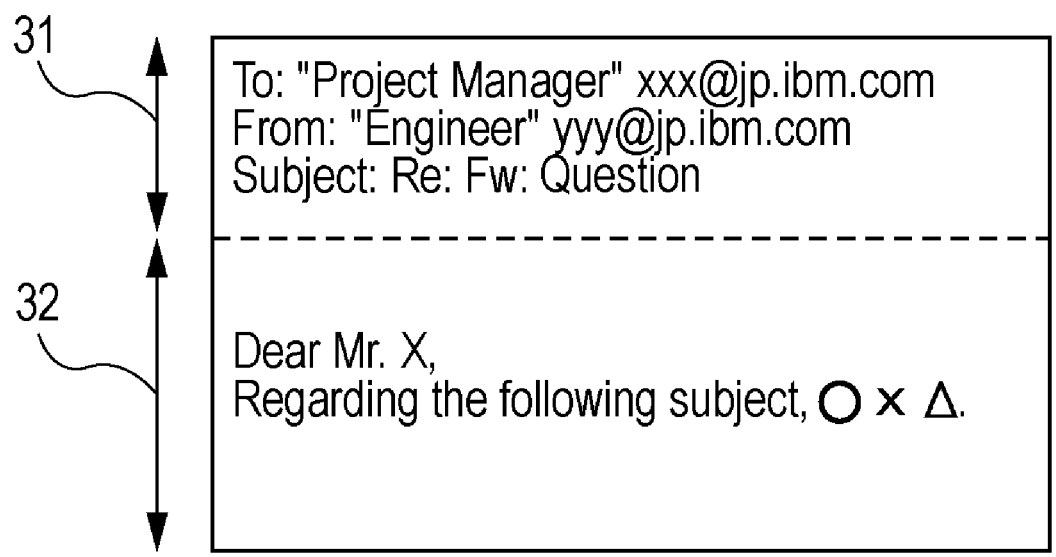
FIG. 3 is an illustration of an example of one embodiment of the definition of the structure of an electronic message.

In the embodiment, a body part means a part obtained by removing a header part from an electronic mail. FIG. 3 is an illustration of an example of one embodiment of the definition of the structure of an electronic mail (or message). In the embodiment, a part where, for example, information on a destination that includes the address of the destination, a destination ID for identifying the destination, and the like, information on a source that includes the address of the source, a source ID for identifying the source, and the like, and information on the subject of an electronic mail are described is defined as a header part 31. A part other than the header part 31 is defined as a body part 32.

Returning to FIG. 1, the communication interface 17 is connected to the internal bus 18 and can send and receive data to and from the external computers 3 and the like by being connected to the external networks 2, such as the Internet, a LAN, and a WAN.

The I/O interface 14 is connected to data input media such as a keyboard 21 and a mouse 22 and accepts data input. Moreover, the video interface 15 is connected to a display unit 23 such as a CRT monitor or an LCD and displays predetermined images.

Figure 4:
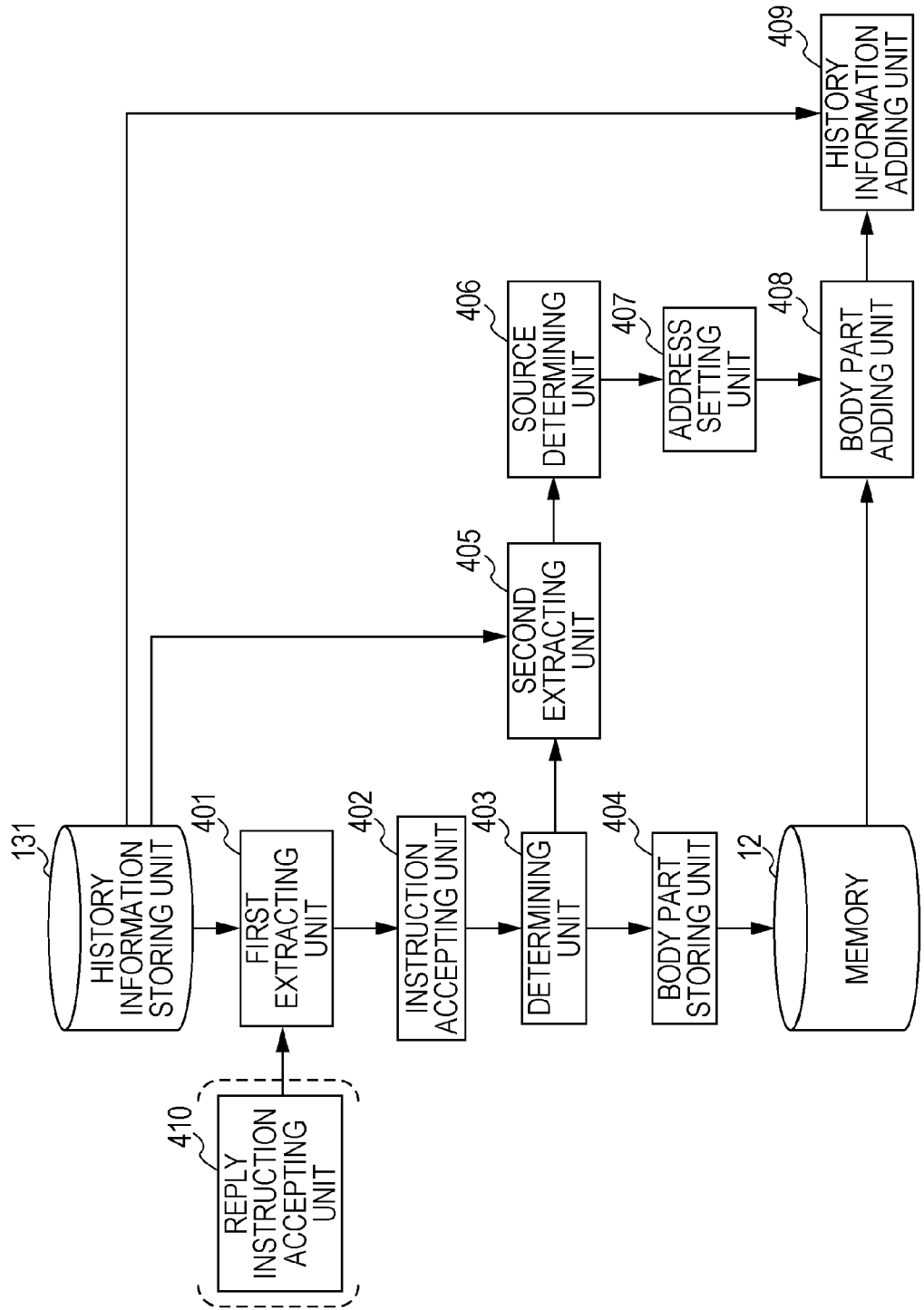
FIG. 4 is a functional block diagram of one embodiment of the reply message creation support device.

Operations of the reply mail creation support device 1 configured as described above will now be described. FIG. 4 is a functional block diagram of one embodiment of the reply mail creation support device 1.

In FIG. 4, a first extracting unit 401 extracts an electronic mail that has been stored most recently from history information stored in the history information storing unit 131. That is, the first extracting unit 401 extracts an electronic mail to be referred to as a reply mail in a general mail sending and receiving device.

An instruction accepting unit 402 accepts an instruction indicating that the body part of the extracted electronic mail is necessary to a reply mail to be created. Regarding an operation of accepting an instruction, an instruction button may be clicked using the mouse 22, or input of an explicit instruction using the keyboard 21 may be accepted.

A determining unit 403 determines whether the instruction accepting unit 402 has accepted an instruction indicating that the body part is necessary. When the determining unit 403 determines that an instruction indicating that the body part is necessary has been accepted, a body part storing unit 404 temporarily stores the body part of the extracted electronic mail in the memory 12.

A second extracting unit 405 extracts an electronic mail that has been stored next most recently from the history information stored in the history information storing unit 131. That is, the electronic mail stored most recently can be exempted from being referred to as a reply mail, and an electronic mail to be referred to as a reply mail can be retrieved by sequentially extracting electronic mails.

A source determining unit 406 determines whether information on a source in the header part of the electronic mail extracted by the second extracting unit 405 matches information on the author of a reply mail. That is, electronic mails the respective sources of which are the author of a reply mail can be exempted from being referred to as a reply mail by determining whether each of the sources is the author.

When the source determining unit 406 determines that the information on the source in the header part of the extracted electronic mail matches the information on the author of the reply mail, electronic mails stored as history information can be skipped until it is determined that the information on the source does not match the information on the author by sequentially extracting an electronic mail that has been stored next most recently from the history information stored in the history information storing unit 131.

When the source determining unit 406 determines that the information on the source in the header part of the extracted electronic mail does not match the information on the author of the reply mail, an address setting unit 407 sets the address of the source to the address of the destination of the reply mail.

A body part adding unit 408 adds the body part of the electronic mail temporarily stored in the memory 12 to the created reply mail. That is, the body part adding unit 408 adds the body part to the created reply mail, the determining unit 403 determining that the instruction indicating that the body part is necessary has been accepted.

A history information adding unit 409 adds, to the created reply mail, history information preceding the electronic mail extracted by the second extracting unit 405. When an electronic mail to be referred to as a reply mail is determined, history information preceding the determined electronic mail is added to a reply mail, as is the case with known mail sending and receiving devices. That is, the determined electronic mail and the history information preceding the determined electronic mail are added.

Moreover, a reply instruction accepting unit 410 may be provided to accept an instruction to create a reply mail. Regarding an operation of accepting an instruction to create a reply mail, an instruction button may be clicked using the mouse 22, or input of an explicit instruction using the keyboard 21 may be accepted. When an instruction to create a reply mail has been accepted, after a regular reply mail is created, the first extracting unit 401 starts to extract an electronic mail.

Figure 5:
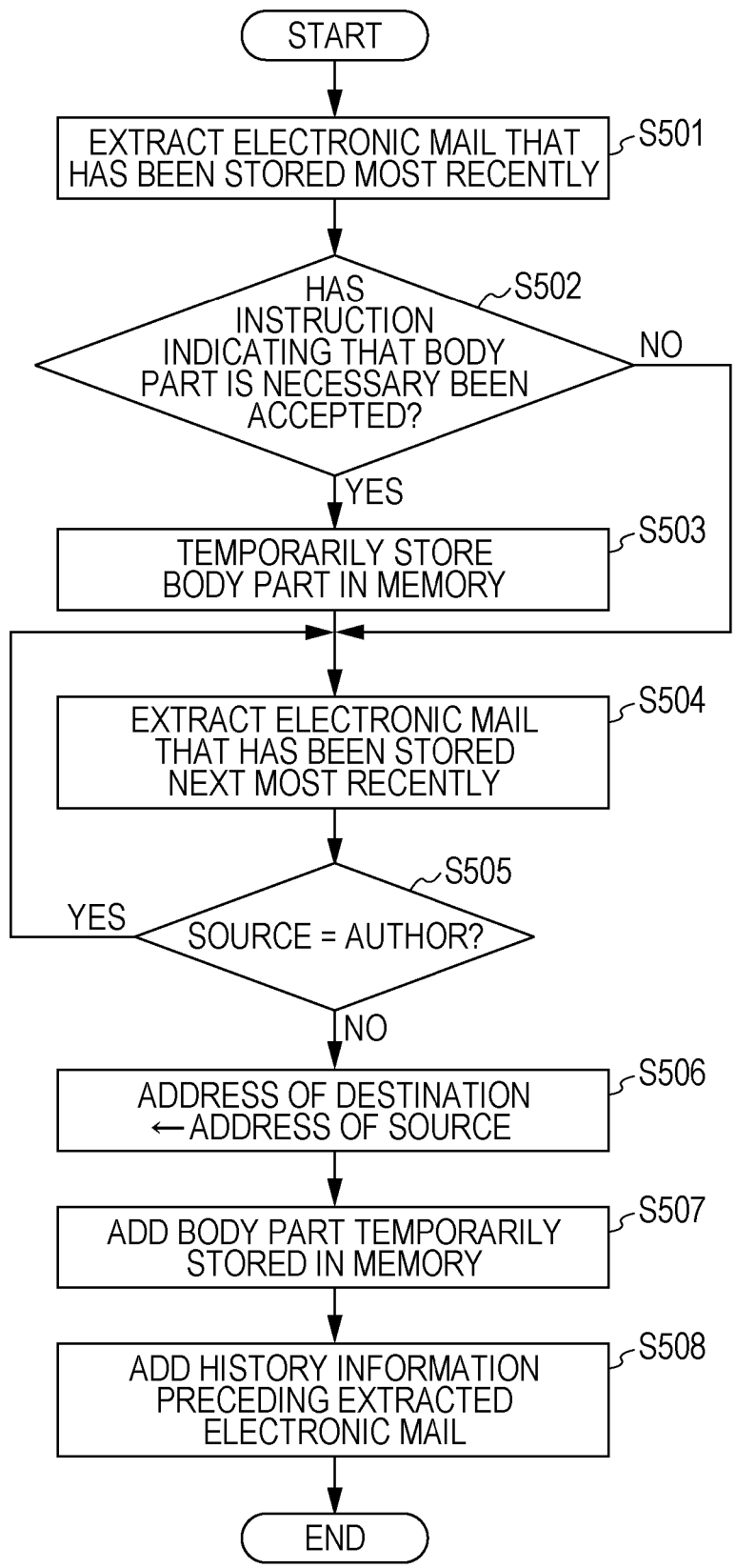
FIG. 5 is a flowchart showing operations of one embodiment of a central processing unit (CPU) of the reply message creation support device.

FIG. 5 is a flowchart showing operations of the CPU 11 of the reply mail creation support device 1 according to the embodiment of the present invention. The CPU 11 of the reply mail creation support device 1 according to the embodiment of the present invention extracts an electronic mail that has been stored most recently from history information stored in the history information storing unit 131 (step S501). Thus, an electronic mail to be referred to as a reply mail in a general mail sending and receiving device can be extracted, the electronic mail having been received most recently.

The CPU 11 determines whether an instruction indicating that the body part of the extracted electronic mail is necessary to a reply mail to be created has been accepted (step S502). Regarding an operation of accepting an instruction indicating that the body part of the extracted electronic mail is necessary to a reply mail to be created, an instruction button may be clicked using the mouse 22, or input of an explicit instruction using the keyboard 21 may be accepted.

When the CPU 11 determines that an instruction indicating that the body part is necessary has been accepted (step S502: YES), the CPU 11 temporarily stores the body part of the extracted electronic mail in the memory 12 (step S503).

When the CPU 11 determines that an instruction indicating that the body part is necessary has not been accepted (step S502: NO), the CPU 11 skips step S503 and extracts an electronic mail that has been stored next most recently from the history information stored in the history information storing unit 131 (step S504). Thus, the electronic mail stored most recently can be exempted from being referred to as a reply mail, and an electronic mail to be referred to as a reply mail can be retrieved by sequentially extracting electronic mails.

The CPU 11 determines whether information on a source in the header part of the extracted electronic mail matches information on the author of a reply mail (step S505). That is, electronic mails the respective sources of which are the author of a reply mail can be exempted from being referred to as a reply mail by determining whether each of the sources is the author.

When the CPU 11 determines that the information on the source in the header part of the extracted electronic mail matches the information on the author of the reply mail (step S505: YES), the CPU 11 causes the process to return to step S504 and sequentially extracts an electronic mail that has been stored next most recently from the history information stored in the history information storing unit 131. Thus, electronic mails stored as history information can be skipped until it is determined that the information on the source does not match the information on the author.

When the CPU 11 determines that the information on the source in the header part of the extracted electronic mail does not match the information on the author of the reply mail (step S505: NO), the CPU 11 sets the address of the source to the address of the destination of the reply mail (step S506) and adds the body part of the electronic mail temporarily stored in the memory 12 to the created reply mail (step S507). Thus, the body part can be added to the created reply mail, the instruction indicating that the body part is necessary having been accepted.

The CPU 11 adds, to the created reply mail, history information preceding the electronic mail stored next most recently and extracted in step S504 (step S508). Thus, when an electronic mail to be referred to as a reply mail is determined, history information preceding the determined electronic mail can be added to a reply mail, as is the case with known mail sending and receiving devices.

Figure 6:
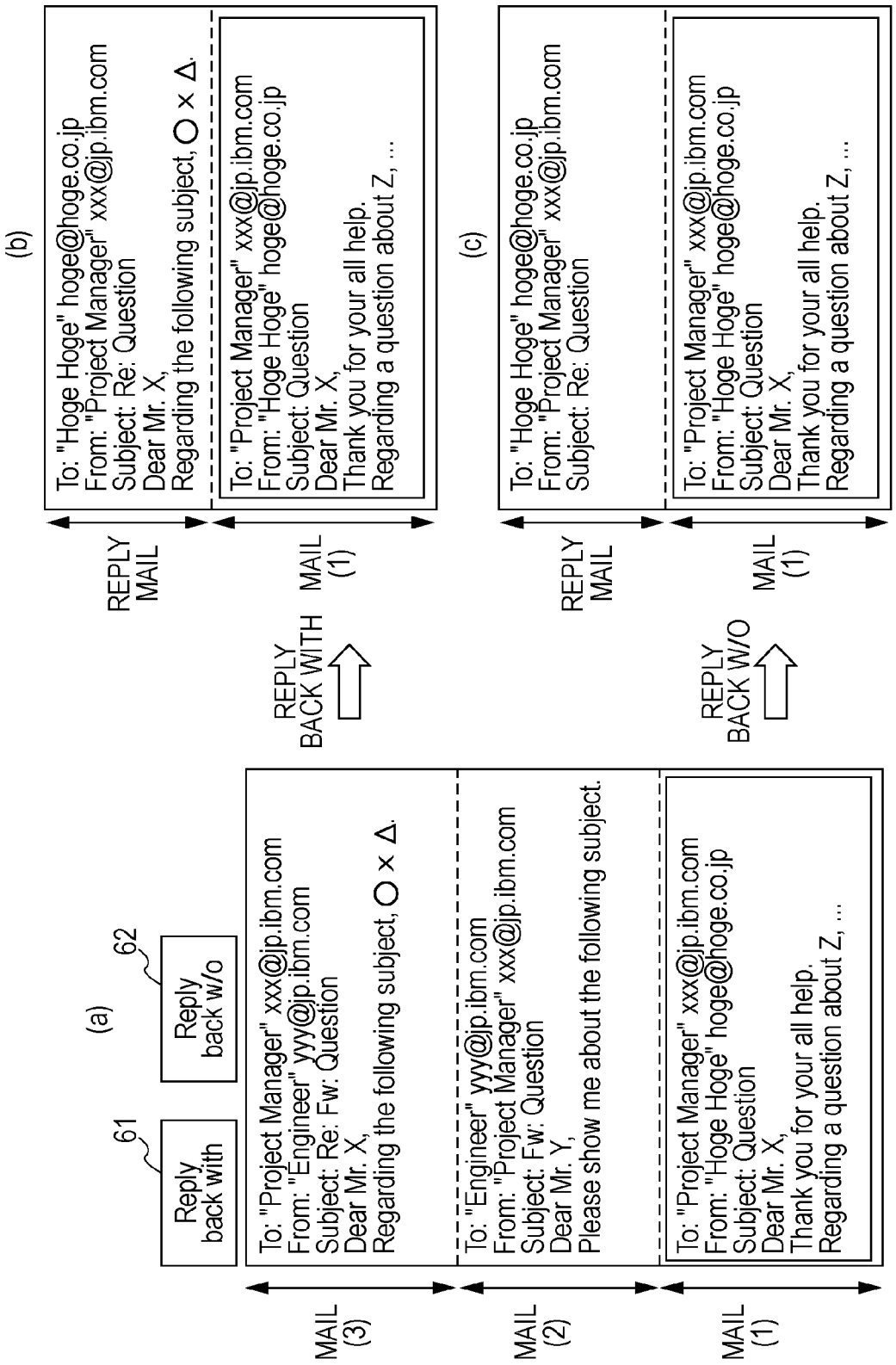
FIG. 6 is an illustration of one embodiment of the process of creating a reply message in the reply message creation support device.

FIG. 6 is an illustration of the process of creating a reply mail in the reply mail creation support device 1 according to the embodiment of the present invention. FIG. 6(a) is an illustration of an example of history information of sent and received electronic mails before a reply mail is created. FIG. 6(a) shows a state in which a question mail was sent from Mr. "HogeHoge" to a project manager (a mail (1)), the project manager forwarded the question mail to an engineer (a mail (2)), and the project manager received an answer from the engineer (a mail (3)).

In the embodiment, a button for accepting an instruction to create a reply mail and an instruction indicating that the body part of an extracted electronic mail is necessary at the same time is disposed above the display screen of a received electronic mail. When a "Reply back with" button 61 is clicked, using, for example, the mouse 22, the CPU 11 first extracts the mail (3), which is an electronic mail that has been received most recently. At the same time, since the CPU 11 determines that an instruction indicating that the body part is necessary has been accepted (step S502 in FIG. 5: YES), the body part of the extracted mail (3) is added to a reply mail, as shown in FIG. 6(b).

Although the CPU 11 then extracts the mail (2), which has been sent next most recently, since the source is the author, the CPU 11 skips the mail (2) and extracts the mail (1), which has been received next most recently. Since the source of the mail (1) is not the author, the mail (1) is added as history information, as shown in FIG. 6(b).

On the other hand, when a "Reply back w/o" button 62 is clicked, using, for example, the mouse 22, the CPU 11 first extracts the mail (3), which is an electronic mail that has been received most recently. Since the CPU 11 determines that an instruction indicating that the body part is necessary has not been accepted (step S502 in FIG. 5: NO), the body part of the extracted mail (3) is not added to the reply mail, as shown in FIG. 6(c).

Although the CPU 11 then extracts the mail (2), which has been sent next most recently, since the source is the author, the CPU 11 skips the mail (2) and extracts the mail (1), which has been received next most recently. Since the source of the mail (1) is not the author, the mail (1) is added as history information, as shown in FIG. 6(c).

In this manner, in the embodiment, a reply mail including an answer can be created directly for Mr. "HogeHoge" who sent the first electronic mail including a question, and time necessary to retrieve an electronic mail received from Mr. "HogeHoge" in a known manner can be reduced.

Figure 7:
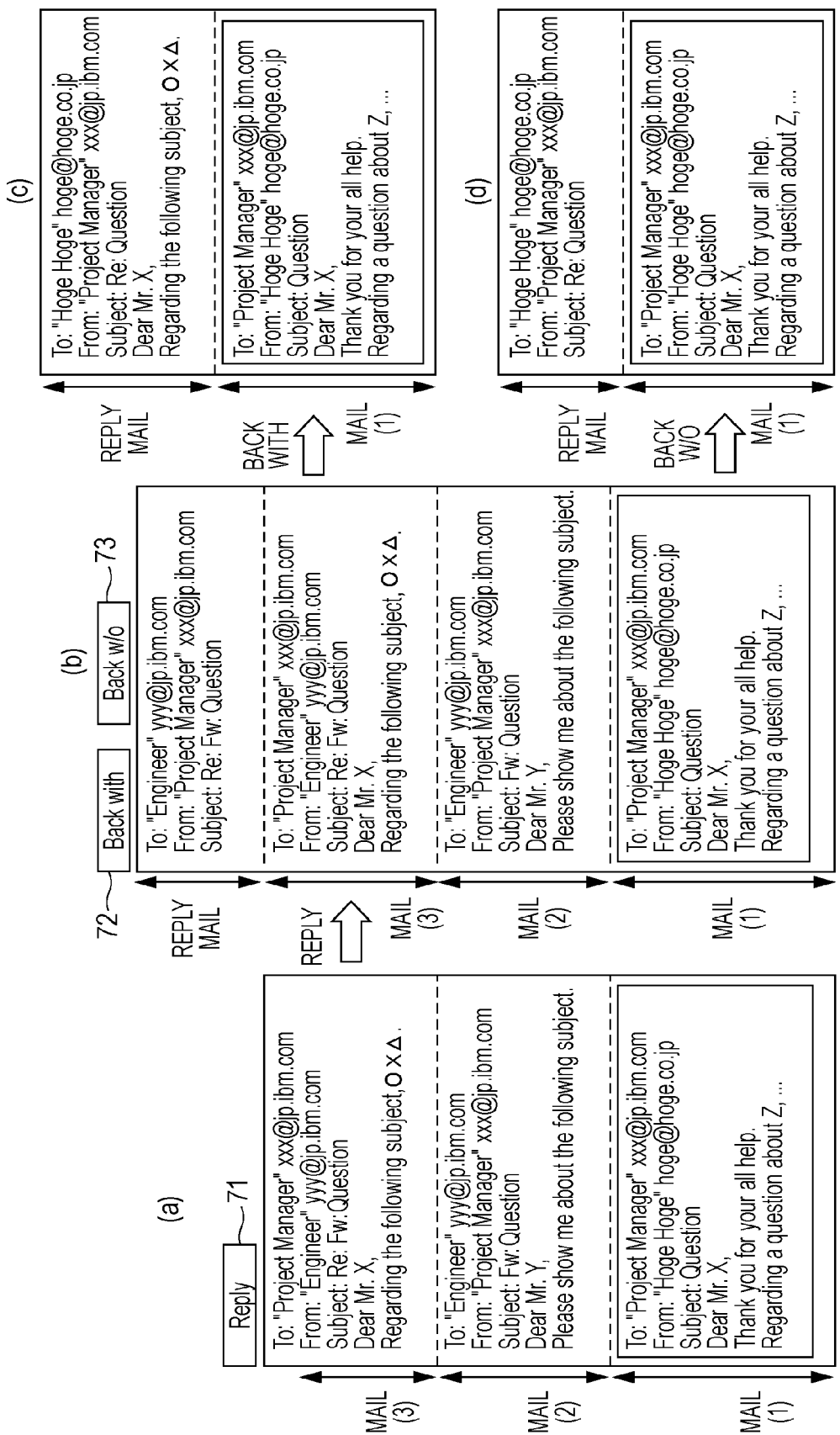
FIG. 7 is an illustration of one embodiment of the process of first creating a reply message and then changing the reply message to a desired reply message in the reply message creation support device.

FIG. 7 is an illustration of the process of first creating a reply mail and then changing the reply mail to a desired reply mail in the reply mail creation support device 1 according to the embodiment of the present invention. FIG. 7(a) is an illustration of an example of history information of sent and received electronic mails before a reply mail is created. As is the case with FIG. 6, FIG. 7(a) shows a state in which a question mail was sent from Mr. "HogeHoge" to the project manager (a mail (1)), the project manager forwarded the question mail to the engineer (a mail (2)), and the project manager received an answer from the engineer (a mail (3)).

In the embodiment, a button for accepting an instruction to create a reply mail is disposed above the display screen of a received electronic mail. When a "Reply" button 71 is clicked, using, for example, the mouse 22, as is the case with known arts, the CPU 11 first creates a reply mail to the mail (3), which is an electronic mail that has been received most recently, and adds the mail (1), the mail (2), and the mail (3) as history information, as shown in FIG. 7(b).

Then, a button for accepting an instruction indicating that the body part of an extracted electronic mail is necessary is disposed above the display screen of the created reply mail. When a "Back with" button 72 is clicked, using, for example, the mouse 22, the CPU 11 first extracts the mail (3), which is an electronic mail that has been received most recently. Since the CPU 11 determines that an instruction indicating that the body part is necessary has been accepted (step S502 in FIG. 5: YES), the body part of the extracted mail (3) is added to the reply mail, as shown in FIG. 7(c).

Although the CPU 11 then extracts the mail (2), which has been sent next most recently, since the source is the author, the CPU 11 skips the mail (2) and extracts the mail (1), which has been received next most recently. Since the source of the mail (1) is not the author, the mail (1) is added as history information, as shown in FIG. 7(c).

On the other hand, when a "Back w/o" button 73 is clicked, using, for example, the mouse 22, the CPU 11 first extracts the mail (3), which is an electronic mail that has been received most recently. Since the CPU 11 determines that an instruction indicating that the body part is necessary has not been accepted (step S502 in FIG. 5: NO), the body part of the extracted mail (3) is not added to the reply mail, as shown in FIG. 7(d).

Although the CPU 11 then extracts the mail (2), which has been sent next most recently, since the source is the author, the CPU 11 skips the mail (2) and extracts the mail (1), which has been received next most recently. Since the source of the mail (1) is not the author, the mail (1) is added as history information, as shown in FIG. 7(d).

In this manner, even after a reply mail is created, a reply mail including an answer can be created directly for Mr. "HogeHoge" who sent the first electronic mail including a question, and time necessary to retrieve an electronic mail received from Mr. "HogeHoge" in a known manner can be reduced.

An electronic mail to be referred to as a reply mail may be determined by tracing back history information more than once. FIG. 8 is an illustration of the process of creating a reply mail in a case where history information is traced back more than once in the reply mail creation support device 1 according to the embodiment of the present invention. FIG. 8(a) is an illustration of an example of history information of sent and received electronic mails before a reply mail is created. FIG. 8(a) shows a state in which a question mail was sent from Mr. "HogeHoge" to the project manager (a mail (5)), the project manager forwarded the question mail to the engineer (a mail (4)), the project manager received an answer from the engineer (a mail (1)), the project manager again sent a question mail to the engineer because the project manager could not get the details (a mail (2)), and the project manager received a detailed answer from the engineer (a mail (3)).

In the embodiment, a button for accepting an instruction to create a reply mail and an instruction indicating that the body part of an extracted electronic mail is necessary at the same time is disposed above the display screen of a received electronic mail. When a "Reply back with" button 81 is clicked, using, for example, the mouse 22, the CPU 11 first extracts the mail (3), which is an electronic mail that has been received most recently. At the same time, since the CPU 11 determines that an instruction indicating that the body part is necessary has been accepted (step S502 in FIG. 5: YES), the body part of the extracted mail (3) is added to a reply mail, as shown in FIG. 8(b).

Although the CPU 11 then extracts the mail (2), which has been sent next most recently, since the source is the author, the CPU 11 skips the mail (2) and extracts the mail (1), which has been received next most recently. Since the source of the mail (1) is not the author, the mail (1) and the mail (4) and the mail (5) sent and received before the mail (1) was received are added as history information, as shown in FIG. 8(b).

Then, a button for accepting an instruction indicating that the body part of an extracted electronic mail is necessary is disposed above the display screen of the created reply mail. When a "Back with" button 82 is clicked, using, for example, the mouse 22, the CPU 11 first extracts the mail (1), which is an electronic mail that has been received most recently. Since the CPU 11 determines that an instruction indicating that the body part is necessary has been accepted (step S502 in FIG. 5: YES), the body part of the extracted mail (1) is added to the reply mail, as shown in FIG. 8(c).

Although the CPU 11 then extracts the mail (4), which has been sent next most recently, since the source is the author, the CPU 11 skips the mail (4) and extracts the mail (5), which has been received next most recently. Since the source of the mail (5) is not the author, the mail (5) is added as history information, as shown in FIG. 8(c).

On the other hand, when a "Back w/o" button 83 is clicked, using, for example, the mouse 22, the CPU 11 first extracts the mail (1), which is an electronic mail that has been received most recently. Since the CPU 11 determines that an instruction indicating that the body part is necessary has not been accepted (step S502 in FIG. 5: NO), the body part of the extracted mail (1) is not added to the reply mail, as shown in FIG. 8(d).

Although the CPU 11 then extracts the mail (4), which has been sent next most recently, since the source is the author, the CPU 11 skips the mail (4) and extracts the mail (5), which has been received next most recently. Since the source of the mail (5) is not the author, the mail (5) is added as history information, as shown in FIG. 8(d).

In this manner, a reply mail including an answer can be created directly for Mr. "HogeHoge" who sent the first electronic mail including a question by tracing back history information including sent and received electronic mails more than once, and time necessary to retrieve an electronic mail received from Mr. "HogeHoge" in a known manner can be reduced.

As described above, according to the embodiment, even in a case where electronic mails are exchanged among a plurality of users more than once, a past electronic mail to be referred to as a reply mail can be efficiently retrieved, and a reply mail can be created by adding the body part of a retrieved electronic mail. Moreover, an easily viewable reply mail corresponding to the usage can be created by accepting an instruction indicating whether or not the body part of a past electronic mail is added.

The present invention is not limited to the aforementioned embodiment, and various changes, improvements, and the like may be made within the spirit of the present invention. For example, the issuance of an instruction to create a reply mail, an instruction indicating that a body part is necessary, and the like may be performed not only by an operation of clicking buttons disposed on a display screen but also various operations, such as an operation of clicking various types of icons and a drag and drop operation.

What is claimed is:

1. A device comprising:
a history information storing unit for storing history information comprising transmitted electronic messages in chronological order, wherein each message includes a header part and a body part;
a first extracting unit coupled to the history information storing unit, the first extracting unit for extracting a first electronic message from the stored history information, wherein the first electronic message comprises a most recently stored message;
an instruction accepting unit coupled to the first extracting unit, the instruction accepting unit for accepting an instruction indicating that a body part of the first electronic message extracted by the first extracting unit is necessary;
a determining unit coupled to the instruction accepting unit, the determining unit for determining whether the instruction accepting unit has accepted the instruction indicating that the body part is necessary;
a body part storing unit coupled to the determining unit, the body part storing unit for storing the body part of the first electronic message in response to a determination by the determining unit that the instruction has been accepted;
a second extracting unit coupled to the determining unit, the second extracting unit for extracting a second electronic message from the stored history information, wherein the second electronic message comprises next most recently stored message;
a source determining unit coupled to the second extracting unit, the source determining unit for determining whether information on a source in a header part of the second electronic message matches information on an author of a reply message;
an address setting unit coupled to the source determining unit, the address setting unit for setting an address of the source to an address of a destination of the reply message in response to a determination by the source determining means that the information on the source does not match the information on the author;

a body part adding unit coupled to the address setting unit, the body part adding unit for adding the stored body part of the first electronic mail to the reply message; and a history information adding unit coupled to the body part adding unit, the history information adding unit for adding, to the reply message, history information preceding the second electronic message.

2. The device according to claim 1, wherein, in response to a determination by the source determining means that the information on the source in the header part of the second electronic message matches the information on the author of the reply message, an additional electronic message that has been stored next most recently is sequentially extracted from the stored history information until the source determining unit determines that the information on the source does not match the information on the author.

3. The device according to claim 1, further comprising:

a reply instruction accepting unit for accepting an instruction to create the reply message, wherein the first extracting unit is further configured to start extraction of the first electronic message after the reply instruction accepting unit accepts the instruction to create the reply message and a regular reply message is created.

4. A method that can be executed in a computer and can send and receive electronic messages, the method comprising:

storing history information comprising transmitted electronic messages in chronological order, wherein each message includes a header part and a body part;

extracting a first electronic message from the stored history information, wherein the first electronic message comprises a most recently stored message;

accepting an instruction indicating that a body part of the extracted electronic message is necessary;

determining whether the instruction indicating that the body part is necessary has been accepted;

storing the body part of the electronic in response to determining that the instruction has been accepted;

extracting a second electronic message from the stored history information, wherein the second electronic message comprises next most recently stored message;

determining whether information on a source in a header part of the second extracted electronic message matches information on an author of a reply message;

setting an address of the source to an address of a destination of the reply message in response to determining that the information on the source does not match the information on the author;

adding the stored body part of the electronic message to the reply message; and adding, to the reply message, history information preceding the second electronic message.

5. The method according to claim 4, wherein the method further comprises, in response to a determination that the information on the source in the header part of the second electronic message matches the information on the author of the reply message, sequentially extracting an additional electronic message that has been stored next most recently from the stored history information until it is determined that the information on the source does not match the information on the author.

6. The method according to claim 4, further comprising: accepting an instruction to create the reply message; and starting extracting the first electronic message after creating a regular reply message.

7. A computer program product for execution in a computer capable of sending and receiving electronic messages, the computer program product comprising:

a non-transitory computer readable storage medium having computer usable program code embodied therewith, the computer usable program code comprising:

history information storing code for storing history information comprising transmitted electronic messages in chronological order, wherein message includes a header part and a body part;

first extracting code for extracting a first electronic message from the stored history information, wherein the first electronic message comprises a most recently stored message;

instruction accepting code for accepting an instruction indicating that a body part of the first electronic message is necessary;

determining code for determining whether the instruction accepting code has accepted the instruction indicating that the body part is necessary;

body part storing code for storing the body part of the first electronic message in response to a determination by the determining code that the instruction has been accepted;

second extracting code for extracting a second electronic message from the stored history information, wherein the second electronic message comprises next most recently stored message;

source determining code for determining whether information on a source in a header part of the second electronic message matches information on an author of a reply message;

address setting code for setting an address of the source to an address of a destination of the reply message in response to a determination by the source determining code that the information on the source does not match the information on the author;

body part adding code for adding the stored body part of the first electronic message to the reply message; and history information adding code for adding, to the reply message, history information preceding the second electronic message.

8. The computer program product according to claim 7, wherein the computer usable program code further comprises code for sequentially extracting, in response to a determination that the information on the source in the header part of the second electronic message matches the information on the author of the reply message, an additional electronic message that has been stored next most recently from the stored history information until the source determining code determines that the information on the source does not match the information on the author.

9. The computer program product according to claim 7, wherein the computer usable program code further comprises:

reply instruction accepting code for accepting an instruction to create the reply message; and code for starting extraction of the first electronic message after the reply instruction accepting code accepts the instruction to create the reply message and a regular reply message is created.

* * * * *